Figure 1:
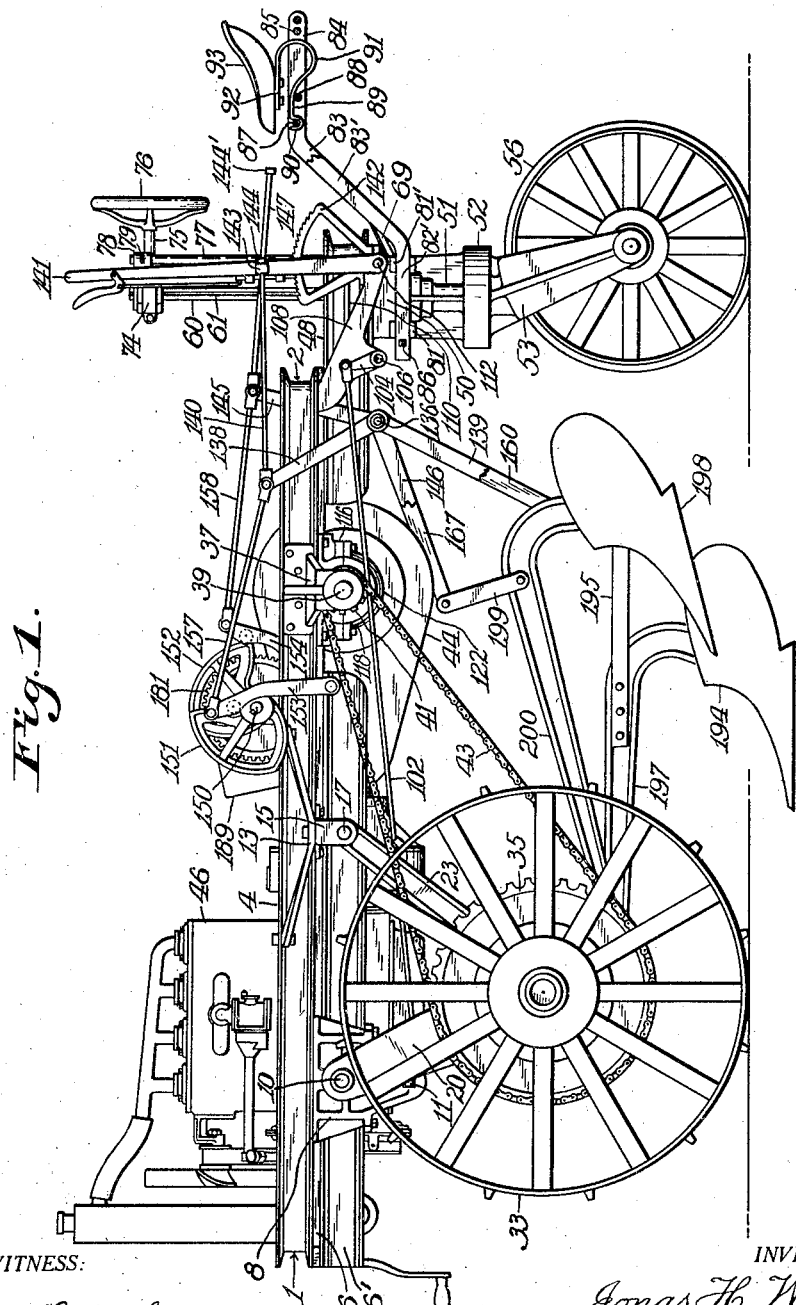

Sept. 11, 1923.  1,467,822
J. H. WIEST
GENERAL UTILITY TRACTION MACHINE
Filed Feb. 2, 1920  4 Sheets-Sheet 2

WITNESS:
Robert Liebrich.
F. M. Roeder

INVENTOR:
Jonas H. Wiest,
BY
E. D. Silvius,
ATTORNEY.

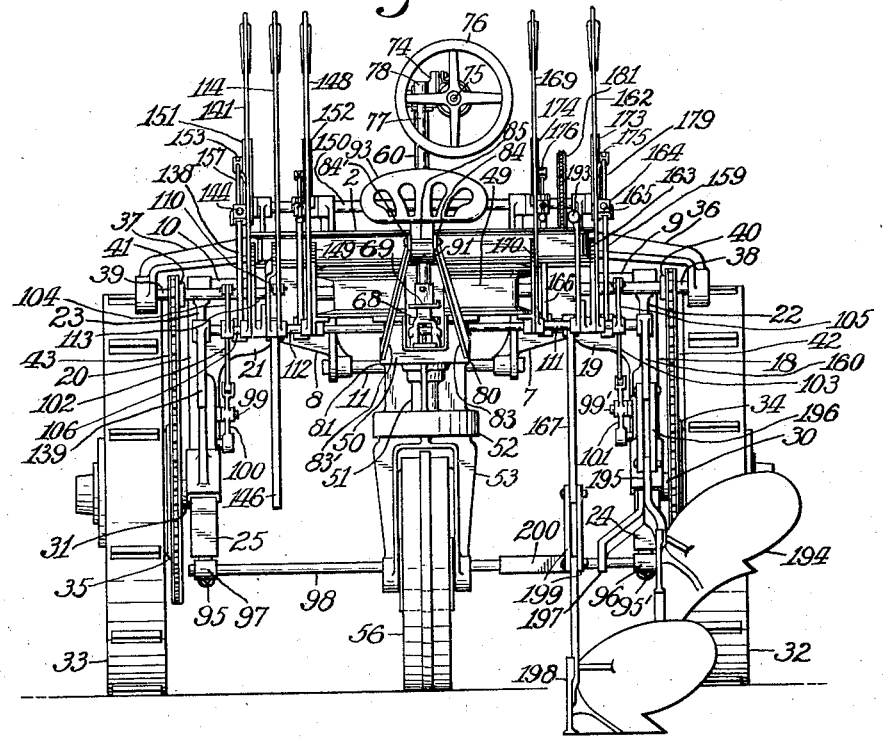

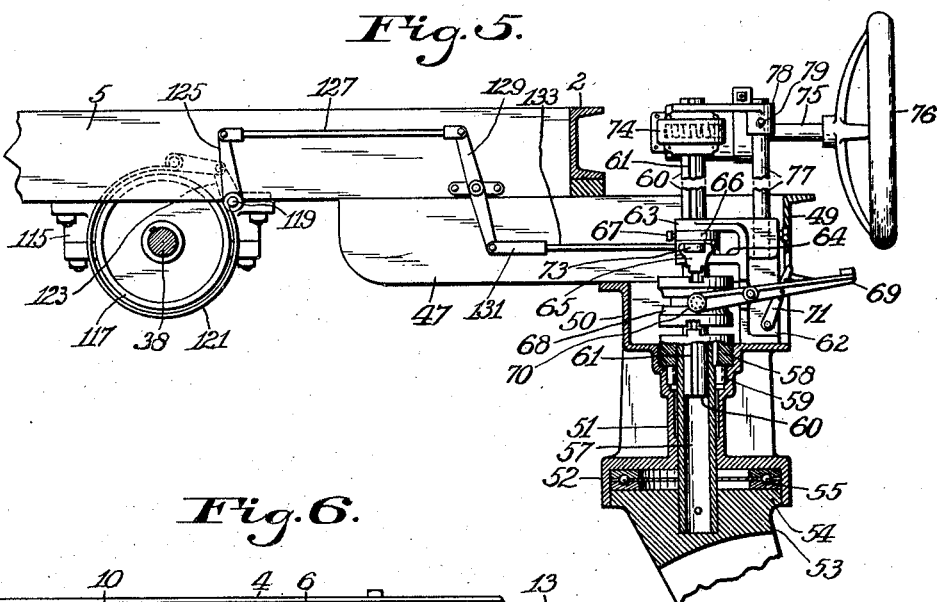

Patented Sept. 11, 1923.

1,467,822

UNITED STATES PATENT OFFICE.

JONAS H. WIEST, OF ELYRIA, OHIO.

GENERAL-UTILITY TRACTION MACHINE.

Application filed February 2, 1920. Serial No. 355,580.

*To all whom it may concern:*

Be it known that I, JONAS H. WIEST, a citizen of the United States, residing at Elyria, in the county of Lorain and State of Ohio, have invented a new and useful General-Utility Traction Machine, of which the following is a specification, reference being had to the accompanying drawings and to the letters and figures of reference marked thereon.

This invention relates to a power traction machine that is designed for general utility and especially in farming districts, for operating various agricultural or other implements, the invention having reference more particularly to a tractor having an explosion engine as the source of power, and having also a high frame constructed so as to provide large clearance space under the frame for various implements and to clear growing plants during cultivating operations.

An object of the invention is to provide an improved tractor of medium or small size that shall be so constructed as to be suitable as a general utility tractor on farms or elsewhere and which shall be adapted to be readily controlled, and especially so as to be capable of being turned in the minimum space.

Another object is to provide an improved tractor which shall be so constructed as to be capable of developing great tractive power, particularly when pulling plows, and be adapted to draw the plows close to the edges of fields, to avoid leaving much waste space near the field fences.

A further object is to provide a three-wheeled tractor which shall be so constructed as to be adapted to be steered either by means of a hand-operated steering wheel or by means of two of the wheels which are traction wheels, with great power and precision.

A still further object is to provide a general utility tractor of such construction as to have a simple and strong open work frame adapted to be utilized to carry loads under it, and which shall have powerful lifting apparatus so constructed as to be adapted to be operated either by means of a power motor or by hand, which machine shall be strong and reliable, durable and economical in use, and be adapted to enable the operator to ride low so as to be able to observe various operations, or to ride relatively high and be enabled to better observe various other operations which may be performed by the tractor machine.

With the above-mentioned and other objects in view, the invention consists in a tractor of novel construction generally and having particularly an arched frame of novel construction adapted to receive various implements under it and to clear rows of plants; the tractor being provided with draft apparatus, lifting apparatus, and steering apparatus, all of novel construction and arrangement; and, the invention consists further in the novel parts, and in the combinations and arrangements of parts, as hereinafter particularly described and further set forth in the accompanying claims.

Figure 2:
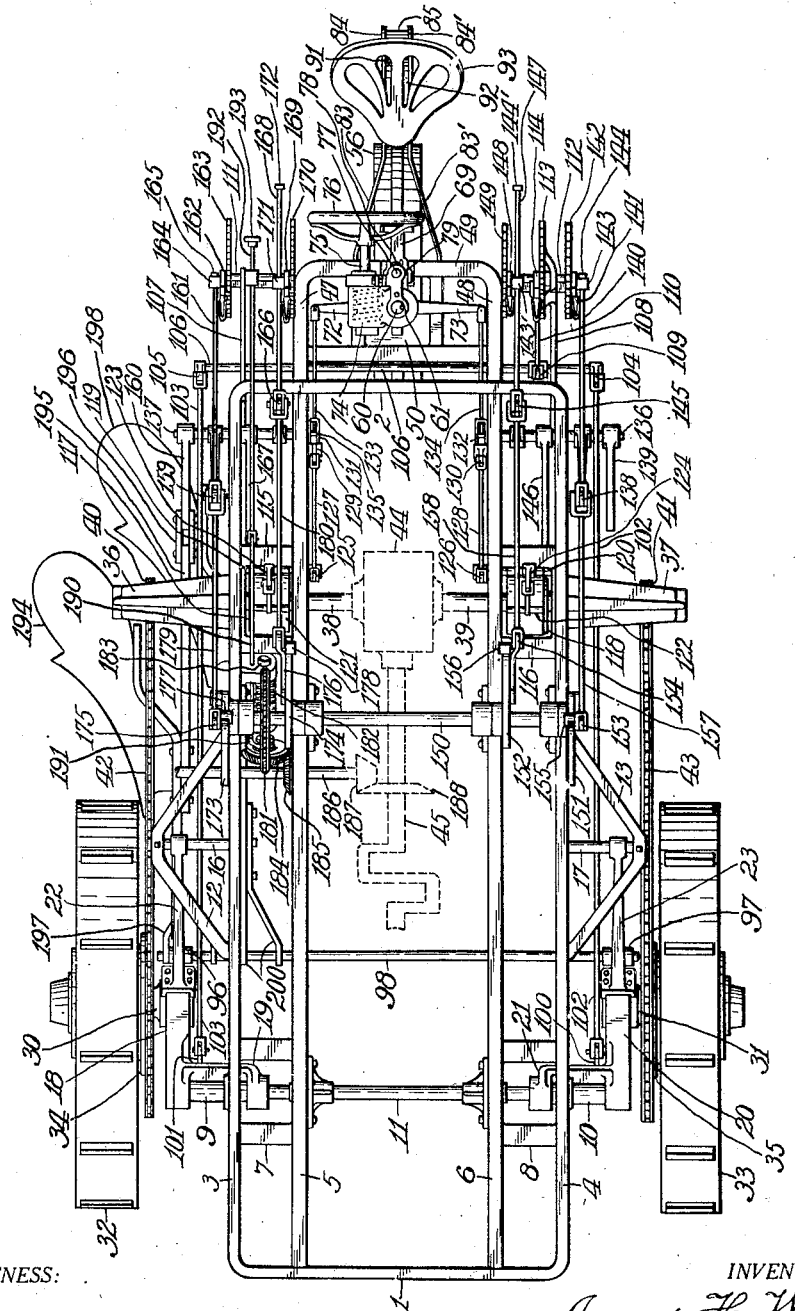

Referring to the drawings,—Figure 1 is a side elevation of the improved tractor, two plows being connected therewith; Fig. 2 is a top plan of the tractor, minus the explosion engine; Fig. 3 is a rear elevation of the tractor; Fig. 4 is a fragmentary side elevation; Fig. 5 is a fragmentary vertical central section on an enlarged scale illustrating particularly the novel steering apparatus; Fig. 6 is a fragmentary side elevation on an enlarged scale showing particularly improved construction relative to the frame arch feature; Fig. 7 is a fragmentary detail of portions of the steering apparatus; and, Fig. 8 is a fragmentary side elevation clearly showing elements of the lifting apparatus on an enlarged scale.

Similar reference characters in the different figures of the drawings indicate corresponding elements or features of construction herein referred to in detail.

As preferably constructed the main frame comprises transverse bars 1 and 2 to which side bars 3 and 4 are connected, intermediate bars 5 and 6 being connected also to the transverse bars, the intermediate bars preferably being deeper than the side bars and having sub-frame bars 5' and 6' secured to the under side thereof. Two housings 7 and 8 are secured to the frame at a suitable distance from the transverse bar 1 and horizontally support suitable lateral bars 9 and 10 respectively, and preferably the housings have a tie bar 11 secured thereto. Rearward of the housings the main frame has outrigger braces 12 and 13 secured to opposite sides respectively thereof that are provided respectively with drop members 14 and 15. A horizontal bar 16 is secured to the side bar 3 and to the member 14 and a horizontal bar 17 is secured to the side bar 4 and the member 15. The main frame is provided with novel pedestals to carry the major portion of the frame higher than the traction or driving wheels, one pedestal comprising an arm 18 having a lateral brace 19 and connected to the bar 9, the companion pedestal comprising an arm 20 having a lateral brace 21 and connected to the bar 10; and an arm brace 22 is secured to the arm 18 and connected to the brace 16, the opposite arm 20 having a brace 23 secured thereto and connected to the bar 17. Thus constructed the pedestals are substantially V-shape in contour. The arms 18 and 20 of the pedestals have boxing portions 24 and 25 respectively in each of which is a longitudinal slot 26 having a head block 27 fitted to operate therein and suitably guided, as by means of a guide bar 28 on which is a spring 29 suitably seated in the arm to constitute a shock absorber; and the head blocks have stub axles 30 and 31 thereon respectively on which suitable traction wheels 32 and 33 are respectively mounted to rotate thereon. The traction or driving wheels may be variously constructed, a common type being shown. The wheel 32 has a sprocket wheel 34 secured to the inner side thereof and the wheel 33 has a similar sprocket wheel 35 secured thereto.

Rearward of the braces 12 and 13, brace arms 36 and 37 are secured to the opposite sides respectively of the main frame and rotatably support driving shafts 38 and 39 in alinement, the shafts being suitably supported otherwise and having small sprocket wheels 40 and 41 secured thereto respectively. A sprocket chain 42 is connected with the sprocket wheels 34 and 40 and a sprocket wheel 43 is connected with the wheels 35 and 41. The driving shafts 38 and 39 may be variously actuated, as by means of suitable differential gearing in a suitable housing 44 as in common practice to be operated by a driving shaft 45 of an explosion engine 46, either directly or indirectly as may be desired.

The rearward portion of the main frame is provided with a downward-extending pedestal which is supported by a carrying wheel, so that large clearance space is provided under the main frame, the latter preferably including extension frame bars 47 and 48 secured to the under side of the intermediate bars 5 and 6 and extending rearward, and a transverse end bar 49 connected to the extension bars. A pedestal base 50 is secured to the under side of the extension frame and it has a downward extending hollow stem 51 provided at its lower end with a bearing box 52 in which a forked caster wheel frame 53 is rotatably arranged to support the pedestal, the frame having a head portion 54 extending into the bearing box and suitably provided with ball-bearings 55 of suitable design; and a carrying wheel 56 is rotatably mounted in the wheel frame, so that the wheel frame constitutes an extension portion of the pedestal. The caster wheel frame is provided with a hollow shank 57 that extends upward through the stem 51 and is rotatable therein, the shank being fixed to the wheel frame. A clutch member 58 is fixedly secured to the upper portion of the shank 57, and bearing rollers 59 are arranged about the shank within the stem 51. A steering shaft 60 is arranged in the hollow shank 57, preferably so as to be vertically adjustable therein and it has longitudinal keyways 61 therein to receive a spline or splines. The pedestal base 50 has a suitable housing member 62 fixed therein which is provided with bearing members 63 and 64 through which the shaft 60 extends rotatably. A clutch member 65 is arranged on the shaft 60 between the members 63 and 64 and is loose on the shaft, and a collar 66 provided with a set-screw 67 is arranged between the clutch member and one of the bearing members, the set-screw being adapted to engage the shaft 60 and hold it in longitudinally adjusted position. A clutch collar 68 is splined on the shaft 60 between the clutch members 58 and 65 and adapted to be alternatively engaged therewith or to be disconnected from both, and it is provided with a shifting and controlling lever 69 pivoted to the member 62 and having a fork 70 connected with the clutch collar, a suitable latch 71 being mounted in the pedestal base 50 and adapted to hold the lever 69 in adjusted position. The arrangement provides that when the clutch collar 68 is in clutched engagement with the clutch member 58 the shaft 60 is enabled to turn and control the caster wheel frame, and when disengaged from the member 58 permits the carrying wheel 56 to trail while the caster frame is free to turn in the pedestal. The clutch member 65 has two lateral arms 72 and 73 fixed on opposite sides respectively thereof that control devices whereby the caster wheel frame may be controlled for steering by means of the driving wheels, when the clutch collar 68 is in engagement with the clutch member 65, as will be hereinafter explained. A gear housing 74 is arranged on the steering shaft 60 and has suitable worm gears therein, the character of which will be readily understood, whereby a shaft 75 rotatably connected with the housing 74 may control and rotate the shaft 60, the shaft 75 being provided with a steering wheel 76 for hand operation. Preferably the gear housing 74 with the gear connected with the shaft 60 is vertically adjustable, and suitable provision is made for holding them in adjusted position. A standard 77 is secured to the member 62 of the rear pedestal brace and extends upward parallel to the shaft 60; and the housing 74 has a sleeve 78 fixed thereon that receives the standard and is provided with a set-screw 79 to engage the standard and hold the housing in adjusted position and also to prevent the housing from turning about the shaft 60.

The rear pedestal is provided externally with guides 80 and 80' on one side and similar guides 81 and 81' on the opposite side thereof to support a seat frame which comprises horizontal base bars 82 and 82', relatively angular main bars 83 and 83' and relatively horizontal seat bars 84 and 84', the latter being secured to spacing struts 85. The horizontal bars 82 and 82' are arranged on opposite sides respectively of the pedestal and removably supported by the guides thereon, being secured in place by means of a tie rod 86, permitting the base bars to be arranged in relatively inverted position when it is desired to change the height of the operator's seat. Rods 87 and 88 are arranged between and secured to the seat bars 84 and 84' and are adapted to support a seat spring which comprises a base portion 89 seated upon the rod 88 and having a hook 90 engaging the under side of the rod 87, a loop 91 extending from the portion 89 and a seat portion 92 extending from the loop and directly supporting a seat 93, and thus the operator's seat spring may be readily connected to the seat frame whether the latter is arranged to extend upward as in Fig. 1 or downward as in Fig. 4.

An improved draft appliance is provided whereby to pull various implements or devices, and includes a transverse draw-bar supported to be raised or lowered in order to control the depth of plowing. Each forward pedestal arm 18 and 20 is provided on its forward side with suitable guides 94 which hold or adjustably guide adjusting bars 95 and 95' on the pedestal arms respectively, the lower ends of the adjusting bars preferably having brackets 96 and 97 thereon respectively to which a suitable horizontal draw-bar 98 is connected. One pedestal arm is provided with a pivot 99 and the other with a similar pivot 99', and bell-cranks 100 and 101 are supported on the pivots respectively and suitably connected with the adjusting bars 95 and 95' respectively for control thereof, controlling rods 102 and 103 being connected to the bell-crank respectively and also to lever arms 104 and 105 respectively which are secured to a shaft 106 rotatively supported by brackets 107 and 108 with which the main frame is provided, so that preferably the adjusting bars 95 and 95' are adjusted in unison; but obviously the lever arms 104 and 105 might be adapted to be independently controlled if preferred. A lever arm 109 is secured to the shaft 106 and has an operating rod 110 connected thereto. Pivot shafts 111 and 112 are supported by the brackets 107 and 108 respectively and otherwise as may be desired, and a quadrant 113 is supported by the bracket 108 to be engaged by a lever 114 mounted on the pivot rod 112 and connected to the rod 110, whereby the draw-bar may be conveniently adjusted by the operator riding on the seat 93 and enabled to reach the lever.

For the purpose of enabling the traction or driving wheels to steer or guide the traction machine, the main frame is provided with two housings 115 and 116 in which brake drums 117 and 118 are arranged and secured to the shafts 38 and 39, respectively. The housings support rock-shafts 119 and 120 respectively. Brake bands 121 and 122 are suitably anchored at one end and extend about the brake drums respectively, the opposite ends of the bands being linked to lever arms 123 and 124 secured to the rock-shafts, respectively, to operate the brake bands. Other lever arms 125 and 126 are secured to the rock-shafts and have connecting rods 127 and 128 connected thereto respectively, the rods being connected to levers 129 and 130 which are pivotally supported between their ends on the main frame and suitably connected with the arms 72 and 73 respectively, preferably by means of slip-connections, comprising yokes 131 and 132 pivoted to the levers 129 and 130 respectively, and rods 133 and 134 extending slidingly into the yokes and having each a head 135 thereon within the yoke, the rods 133 and 134 being pivotally connected with the arms 72 and 73 respectively. The slip-connections permit either brake band to be tightened on the drum without forcing the other brake band an unnecessary distance from the drum. When the clutch collar 68 is moved into connection with the clutch member 65 the brake bands may be operated alternatively by means of the shaft 60 and the steering wheel 76, for the purpose of retarding or stopping rotation of either one of the traction wheels while the other rotates, resulting in the machine being steered by means of the traction wheels, which may be desired more particularly when a short turn must be made.

Improved lifting mechanism comprises pivot shafts 136 and 137 suitably supported adjacent to the rearward end of the main frame. A bell-crank structure is provided comprising an arm 138 and an arm 139 suitably connected together to swing on the pivot rod 136, one arm extending upwardly and the other downwardly, and the arm 138 has an operating rod 140 connected thereto. A lever 141 is connected to the pivot shaft 112 to operate in connection with a quadrant 142 adjacently supported, the lever having a boss 143 through which extends the rod 140 which has a head 144 thereon to be engaged by the boss when the lever is drawn backward, the rod 140 being permitted to be moved rearward when the lever is stationary. Another bell-crank is provided which comprises arms 145 and 146 connected together to rock on the pivot rod 136, and a rod 147 is connected with the arm 145 and extends through a boss 143' connected to a lever 148 operating in connection with a quadrant 149, the rod 147 having a head 144'. A cam shaft 150 is rotatably mounted on the main frame and has cams 151 and 152 secured thereto adjacent to one side of the main frame, and cam-operated arms 153 and 154 are pivotally supported on the main frame lower than the shaft 150 and extend upward adjacent to the cams respectively, being provided with rollers 155 and 156 to be engaged by the cams, connecting rods 157 and 158 being connected to the arms 153 and 154 respectively, one rod being connected to the lever arm 138 and the other to the lever arm 145 so that the lifter arms 139 and 146 may be swung upward by means of the power cams to lift plows or heavy articles, while permitting light implements to be lifted by means of the hand levers 141 and 148, and especially in case power for operating the cams is temporarily lacking. The cams may be variously positioned on the shaft 150 but preferably are arranged approximately in "quartered" relation, so that either one of two plows may be lifted independently of the other. While two plows may be used adjacent to one side of the tractor it may be desired to carry two other plows under the opposite side of the tractor to use for return plowing along hillsides; and for such purpose two additional lifters are provided on the opposite side of the machine and they comprise a bell-crank having arms 159 and 160 and mounted on the pivot rod 137, a rod 161 connected to the rod 159, and a lever 162 operating in connection with a quadrant 163, the lever having a boss 164 through which the rod 161 extends, the rod having a head 165 thereon; another bell-crank comprising arms 166 and 167 connected together on the pivot rod 137, a rod 168 being connected to the arm 166 to be operated by a hand lever 169 operating in connection with a quadrant 170, the rod extending through a boss 171 on the lever and having a head 172 thereon; so that the two bell-cranks may be separately operated by hand. To operate the bell-cranks by power means, two cams 173 and 174 are secured to the shaft 150 and cam-operated arms 175 and 176 are pivotally supported on the main frame and have rollers 177 and 178 thereon to be engaged by the cams, respectively; a rod 179 is connected to the arm 175 and to the arm 159, and a rod 180 is connected to the arm 176 and to the crank arm 166; these lifting devices being adapted to be operated and controlled similarly as those described on the opposite side of the machine.

The cam shaft 150 may be variously operated by power means, a worm wheel 181 preferably being secured thereto and in engagement with a worm 182 on a shaft 183 suitably journaled and having a bevel gear wheel 184 secured thereto to be rotated by a bevel gear wheel 185 on a shaft 186 which may be rotated by various means, as a bevel gear 187 driven by a bevel gear 188 on the driving shaft 45 of the engine; and obviously a small engine or motor 189 may be mounted on the main frame to drive the shaft 186. The gear wheel 184 may be arranged to slide on its shaft so as to be disconnected from the gear wheel 185, or it may be adapted to be clutched to its shaft, in which case a clutch rod 190 is suitably guided and has a fork 191 whereby to control the gear wheel 184 to periodically operate the worm. A reach-rod 192 is suitably guided and connected with the rod 190 and it has a knob 193 thereon arranged within reach of the operator.

As illustrating the manner of operating or carrying various articles, two plows are shown, one plow 194 having a handle 195 which is connected by means of links 196 with the lifter arm 160, the plow having a beam 197 connected with the draw-bar 98; and another plow 198 is provided with links 199 pivoted to its beam 200, the links being connected to the lifter arm 167, the beam being connected to the draw-bar 98.

In practical use the operator may adjust the seat 93 to relatively elevated position, the steering wheel 76 being conveniently reached as are the various operating levers; or the seat may be arranged low down as may be required, in which case the steering wheel 76 is lowered so as to be conveniently operated. When ploughing or pulling, the traction power is applied at a low point or near to the axles of the traction wheels, and the drag is partially downward so as to tend to increase the tractive force of the driving wheels. When either one of the driving wheels runs over a stone the shock absorber permits the axle of the wheel to yield, so as to avoid sudden jar to the machine mechanism and prevent a disproportionate amount of the weight to be suddenly forced upon the axle with liability of injury thereto. In some cases the operator will find it advantageous to sit high while at other times it may be of advantage to sit low and better observe operations under the tractor. By lowering the draw-bar the plows may be caused to work relatively deeper in the soil, and the depth may be varied in accordance with the most approved practice with different kinds of soil. The manner of raising and carrying the plows or cultivating implements, and the manner of carrying out the steering operations will be clearly understood by reference to explanations thereof in connection with the description of construction of the machine in detail.

Having thus described the invention, what is claimed as new is—

1. A traction machine including a main frame having downwardly-extending forward pedestals, a draft beam having two end portions carried by the lower portions of the respective pedestals, driving wheels supporting the pedestals respectively, and a carrying wheel supporting the rearward portion of the main frame.

2. A traction machine including a main frame provided with two downward-extending forward pedestals, each pedestal having an adjusting-bar adjustable thereon, a draw-bar connected to the adjusting-bars, traction wheels supporting the pedestals, and a carrying wheel supporting the rearward portion of the main frame.

3. A traction machine having a frame provided on the two opposite outer sides thereof with lateral outrigger members and also downward-extending pedestals, the pedestals having lateral braces secured to the frame sides and also angle braces secured to the outrigger members respectively, traction wheels supporting the pedestals respectively, and a carrying wheel supporting the rear end of the frame.

4. A traction machine including a main frame provided with two downward-extending forward pedestals, two traction wheels supporting the pedestals respectively, a carrying wheel supporting the rearward portion of the main frame, a draw-bar horizontally arranged and having one end thereof adjustably supported by one of the forward pedestals and its opposite end adjustably supported by the other of the forward pedestals and controls to rapidly adjust the ends of the draw-bar.

5. In a general utility traction machine, the combination of a main frame, two forward pedestals, secured to the main frame, two driving wheels supporting the pedestals, two adjusting-bars movably mounted on the pedestals respectively, a draw-bar mounted on the adjusting-bars, two bell-cranks pivotally mounted on the pedestals respectively, and two controlling rods connected to the bell-cranks respectively and provided with operating and controlling devices connected therewith.

6. In a general utility traction machine, the combination with a frame, of a pair of pedestal arms securely connected with the frame, each pedestal arm having two longitudinal guides, a stub-axle head movably arranged in one of the guides, an adjusting-bar movably arranged in the remaining one of the guides, an axle on said head, a driving wheel on the axle, a spring under compression against the pedestal arm and said head, a draft device connected with the adjusting bar, and means to control the adjusting-bar.

7. In a general utility traction machine, the combination with a main frame, and driving wheels supporting the forward portion of the main frame, of a pedestal secured to the rearward portion of the main frame and provided with guides on the opposite sides thereof, a carrying wheel supporting the pedestal, a seat frame comprising two base bars removably supported by the guides on opposite sides of the pedestal respectively and two main bars extending obliquely from the base bars respectively, a tie-bar connected to the base bars, and a seat removably supported substantially by the main bars of the seat frame.

8. In a general utility traction machine, the combination of a main frame having two downward-extending forward pedestals adjacent to one end and a downward-extending rearward pedestal at the opposite end thereof, the rearward pedestal having a rotative caster frame, the caster frame having an upward-extending steering shaft, traction wheels supporting the forward pedestals, a carrying wheel supporting the caster frame, an angular seat frame invertibly mounted on the rearward pedestal and having an invertible seat thereon, and a steering wheel geared to the steering shaft and adjustable upward or downward on the shaft.

9. In a general utility traction machine, the combination of a frame, a hollow pedestal secured to the frame, a caster frame with a wheel supporting the pedestal and provided with a steering shaft extending upward rotatably through the pedestal and the frame, a standard mounted on the frame and extending parallel to the steering shaft, a gear case adjustable on the steering shaft longitudinally and provided with a guide to be adjustably secured to the standard to hold the gear case, an operating shaft rotatable in the gear case with gearing to operate the steering shaft, and a steering wheel secured to the operating shaft.

10. In a general utility traction machine, the combination of a frame having two side bars and two intermediate bars, the side bars having each an outrigger member on its outer side, two housings secured to the side bars respectively and also to the adjacent intermediate bars, two bars horizontally secured to the housings and extending outward beyond the side bars respectively, two pedestal arms having each a lateral brace, the arms and their braces being connected to the horizontal bars respectively, two angle braces secured to the pedestal bars respectively and securely connected also with the outrigger member respectively, a tie-bar secured to said housings, and two driving wheels mounted on the pedestal arms respectively.

11. In a general utility traction machine, the combination of a main frame having a downward-extending rearward pedestal at one end thereof, two traction wheels supporting the opposite end portion of the main frame and provided with driving gearing with differential gearing, two braking appliances for the driving gearing on opposite sides respectively of the differential gearing, a caster frame having a steering shaft rotatively arranged in the pedestal and provided with a hand-operated steering wheel, two operating devices connected with the braking appliances respectively, means for clutching the operating devices to the steering shaft to alternately operate the braking appliances by means of the steering wheel, and a carrying wheel rotatable in the caster frame.

12. In a general utility traction machine, the combination of a main frame, two pedestals secured to the outer portions of the opposite sides respectively of the main frame, two driving wheels rotatably connected with the pedestals respectively, two driven sprocket wheels secured to the driving wheels respectively, two brace arms secured to and extending outward from opposite sides respectively of the main frame, two driving shafts rotatably supported on the main frame and also by the brace arms respectively with differential gearing connected with the shafts, two driving sprocket wheels secured to the driving shafts respectively, a sprocket chain connected with one of the driving sprocket wheels and one of the driven sprocket wheels, and a sprocket chain connected with the remaining one of the driving sprocket wheels and the remaining driven sprocket wheel.

13. In a general utility traction machine, the combination of a main frame having two lateral outrigger members on the two opposite sides thereof respectively, two pedestal arms having rigid connection with said opposite sides respectively of the frame and in proximity to the forward end thereof, said arms extending downwardly and rearwardly and having each a longitudinal guide slot therein and a guide bar coinciding with the slot, two head blocks adjustably guided by the slots and guide bars respectively and having each a stub axle thereon, two inclined angle braces secured to said arms respectively and connected to said outrigger members respectively, two coil springs arranged on said guide bars respectively and seated under compression against the pedestal arms respectively and upon the head blocks respectively, two traction wheels rotatable on the stub axles respectively, a carrying wheel supporting the rearward end of the main frame, and driving gear wheels mounted on the main frame intermediately of the outrigger members and the rearward end of the frame and having gearing connections with the traction wheels respectively.

14. In a general utility traction machine, the combination of a main frame, driving wheels supporting the forward portion of the main frame, a pedestal having a hollow base and a hollow stem, said base being secured to the rearward portion of the main frame, the end of the stem having a bearing box, a caster frame supporting said box and having a hollow shank rotatably guided in said stem, a wheel in the caster frame, a clutch member secured to said shank, a steering shaft extending rotatably through said base and in said shank, a clutch collar splined on said shaft above said clutch member to be lowered to engage the member, said collar being arranged in said base, and a shifting-lever pivoted in said base and connected with said collar.

15. In a general utility traction machine, the combination of a main frame having two forward pedestals and a rearward pedestal extending downward, the frame having also two laterally extending brace arms on opposite sides thereof, two driving wheels rotatable on the forward pedestals respectively, two driving shafts rotatably supported partially by the brace arms respectively and geared with the driving wheels respectively, two housings secured to the main frame and partially supporting the driving shafts respectively, a caster frame with a wheel supporting the rearward pedestal, two brake drums in the housings and secured to the driving shafts respectively, brake bands for the brake drums respectively, brake levers to operate the brake bands respectively, a steering shaft rotatable on the main frame and provided with a steering wheel, the steering shaft being provided also with two steering arms on opposite sides respectively, connections between one of the brake levers and one of the steering arms, and connections between the remaining one of the brake levers and the remaining one of the steering arms, with differential gearing to rotate the driving shafts.

16. In a general utility traction machine, the combination of a main frame, two driving wheels supporting the forward portion of the main frame, two driving shafts rotatably supported on the main frame and geared to the driving wheels respectively, two brake drums secured to the driving shafts respectively, two brake bands to engage the brake drums respectively, a pedestal having a hollow base and a hollow stem, the base being secured to the rearward portion of the main frame, a caster frame supporting said stem and having a hollow shank rotatably guided in the stem, a wheel in the caster frame, a clutch member secured to said shank, a steering shaft extending rotatably through said base and in said shank, a guide member secured in said base and having two guide portions embracing and guiding said shaft, another clutch member loose on said shaft between said guide portions and having two brake arms on opposite sides respectively thereof, operating connections connected with one of the brake bands and one of the brake arms, operating connections connected with the remaining one of the brake bands and the remaining one of the brake arms, and a controllable clutch collar splined on the steering shaft between said clutch members to be moved into engagement with either of the members.

In testimony whereof, I affix my signature in presence of two witnesses.

JONAS H. WIEST.

Witnesses:
JOHN C. CONAWAY,
E. KUSHINSKY.